No. 671,584. Patented Apr. 9, 1901.
F. COMMINGE & A. P. SIPE.
NUT LOCK.
(Application filed May 19, 1900.)
(No Model.)
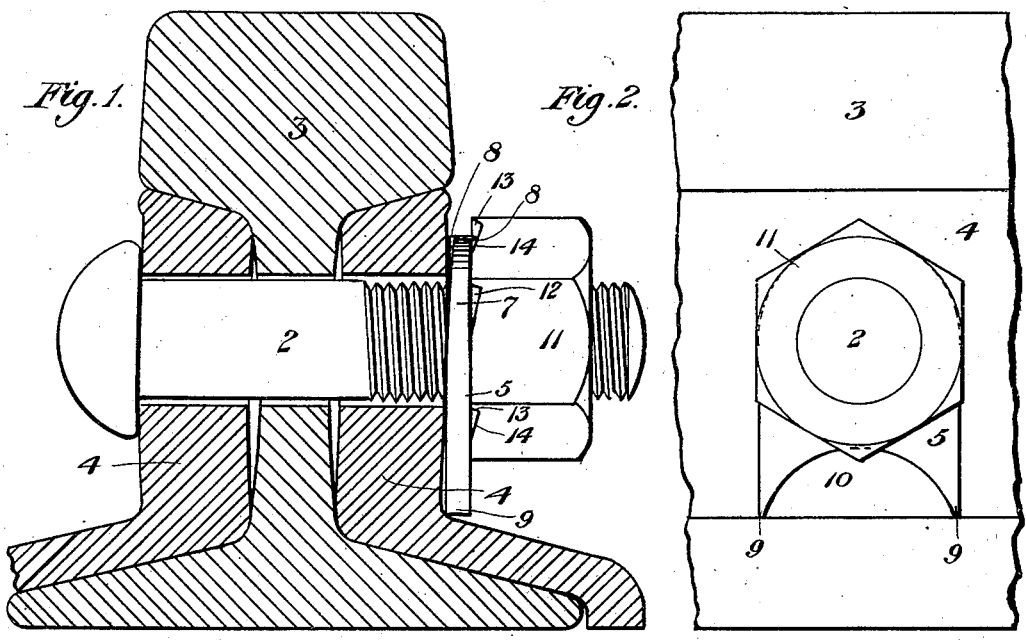
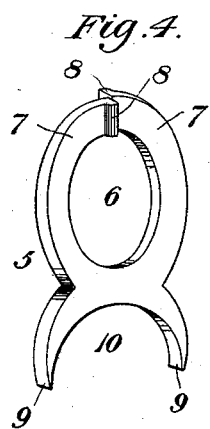
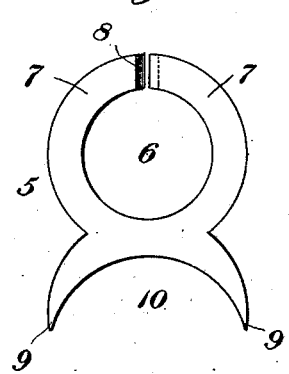
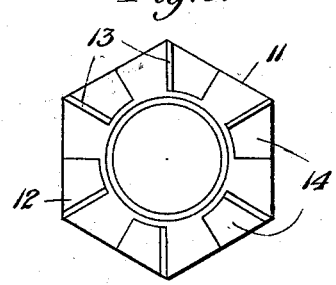
Witnesses:
Inventors:
Frank Comminge
Albert P. Sipe
by C. M. Clarke Atty

UNITED STATES PATENT OFFICE.

FRANK COMMINGE AND ALBERT P. SIPE, OF ALLEGHENY, PENNSYLVANIA.

NUT-LOCK.

SPECIFICATION forming part of Letters Patent No. 671,584, dated April 9, 1901.

Application filed May 19, 1900. Serial No. 17,224. (No model.)

*To all whom it may concern:*

Be it known that we, FRANK COMMINGE and ALBERT P. SIPE, citizens of the United States, residing at Allegheny, in the county of Allegheny and State of Pennsylvania, have invented certain new and useful Improvements in Nut-Locks, of which the following is a specification, reference being had to the accompanying drawings, forming part of this specification, in which—

Figure 1 is a cross-sectional view of a rail-joint, illustrating the application of our improved nut-lock. Fig. 2 is an end view of the bolt with the nut in place. Fig. 3 is a detail face view of the spring locking-washer. Fig. 4 is a detail perspective view thereof. Fig. 5 is a detail view showing the bearing-point turned inward. Fig. 6 is a face view of the under side of the nut.

Our invention relates to nut-locks, and is designed for the purpose of locking the nut upon the bolt within limited periods of its rotation; and it consists of a spring-washer adapted to be placed upon the bolt so as to be incapable of rotation thereon by reason of engagement with the flange of the fish-plate or rail and adapted to engage recesses on the under side of the nut.

Referring to the drawings, 2 represents the bolt, which is of the usual or ordinary construction adapted to use in a rail-joint to connect the rail 3 and fish-plates 4 4. Upon the bolt is placed our improved spring-steel washer 5, provided with an opening 6 for the bolt and having divided circumferential spring extremities 7 7, the terminals of which are arranged in close proximity to each other and are deflected in opposite directions. These extremities taper toward their points and each is provided with oppositely-disposed lugs 8 8, projecting outwardly beyond the plane of its spring member 7. At the opposite end the washer-plate is provided with two bearing-points 9 9, the intervening metal being cut out or recessed, as shown at 10. The sides of the washer may be continued down straight to the points, as shown in Fig. 2, or the curvature of the spring extremities 7 may be extended downwardly and inwardly and then outwardly to the points 9, as shown in Fig. 4, thus rendering the members 7 more elastic, while not impairing the strength of the washer. The distance from the center of opening 6 to the point 9 is made to correspond to the distance from the center of the bolt down to the corner angle of the flange, so that when the washer is placed in position, as shown, it will be effectually prevented from rotating in either direction by reason of the bearing of the points 9.

The nut 11, which may be of any desired shape—hexagon, square, &c.—is provided on its inner face with a series of indentations or depressions 12, adapted to register with one of the lugs 8, the recesses having on one side an abrupt slightly-beveled shoulder 13 and on the other side a longer tapering face 14, thus on one side presenting a good bearing for the lug to prevent unscrewing of the nut, while the more gradual face on the other side permits of its easy adjustment. The abrupt face 13 will, however, permit the nut to be unscrewed by application of excessive force. In applying the nut, the washer having been previously adjusted to position on the bolt, the turning operation will bring the inner face into contact with the lug 8, which will be gradually depressed and will exert a spring action outwardly. As each of the depressions on the under side of the nut comes into register with the lug it will spring outwardly, the beveled faces facilitating the terminal operations by permitting the nut to ride over and depress the lug, which will spring into each succeeding recess, the spring-terminal of the washer having sufficient play by reason of its tapered thickness. The locking operation is obtained through the resistance to the unscrewing of the nut offered by the shoulder 13, which, as has been said, is comparatively abrupt, while the depressions on the under side of the nut are of advantage and value in insuring engagement for the deflected ends of the washer. Good results may be had by using a nut having a flat inner face, the lugs being sufficiently sharp to have a good holding contact with the face of the nut and of the fish-plate, approximating a square shoulder. As thus constructed our nut-lock provides a certain lock against dislodgment or movement of the nut due to jarring of the track from trains or vibration from any source wherever in use, and being operated entirely through the screwing or unscrewing action of the nut it will be seen that it may be applied or reversed with the same wrench, thus obviating the necessity of special tools.

Our invention is very simple, cheap, and efficient and provides a reliable and durable nut-lock, while being capable of use any number of times without wear or damage to the thread of the bolt or to the nut. The washers are stamped out of sheet metal with a minimum of waste, while the nuts may be provided with recesses in the operation of stamping them.

Having described our invention, what we claim, and desire to secure by Letters Patent, is—

1. A nut-lock washer-plate provided with a bolt-hole, surrounding outwardly-deflected spring extremities terminating closely adjacent to each other, having oppositely-projecting rounded terminals of the same depth as the thickness of the washer-plate, the extremities being tapered in thickness on their outer faces so as to provide recesses immediately back of the rounded terminals whereby when under compression of a ratchet-faced nut, said terminals yieldingly engage the ratchet-recesses and the washer affords a substantially flat bearing for the nut, substantially as set forth.

2. A nut-lock washer-plate provided with a bolt-hole, surrounding outwardly-deflected spring extremities terminating closely adjacent to each other, having oppositely-projecting rounded terminals of the same depth as the thickness of the washer-plate, the extremities being tapered in thickness on their outer faces so as to provide recesses immediately back of the rounded terminals whereby when under compression of a ratchet-faced nut, said terminals yieldingly engage the ratchet-recesses and the washer affords a substantially flat bearing for the nut, the washer having downwardly-projecting bearing-points adapted to prevent it from turning, substantially as set forth.

3. In a nut-lock, the combination with a bolt of a washer-plate thereon having surrounding outwardly-deflected spring extremities terminating closely adjacent to each other and provided with oppositely-projecting rounded terminals of the same depth as the thickness of the washer-plate, the extremities being tapered in thickness on their outer faces so as to provide recesses immediately back of the rounded terminals, and a nut having a series of depressions of a depth to admit the entrance of one of the rounded terminals, the depressions having at each side inwardly-sloping beveled shoulders adapted to bear against the rounded spring-terminal whereby when under compression of the nut said terminals yieldingly engage the depressions and the washer affords a substantially flat bearing for the nut, substantially as set forth.

In testimony whereof we affix our signatures in presence of two witnesses.

FRANK COMMINGE.
ALBERT P. SIPE.

Witnesses:
PETER J. EDWARDS,
C. M. CLARKE.